US005712422A

United States Patent [19]

Kato

[11] Patent Number: 5,712,422

[45] Date of Patent: Jan. 27, 1998

[54] ENGINE SENSOR

[75] Inventor: Masahiko Kato, Hamamatsu, Japan

[73] Assignee: Sanshin Kogyo Kabushiki Kaisha, Hamamatsu, Japan

[21] Appl. No.: 708,646

[22] Filed: Sep. 5, 1996

[30] Foreign Application Priority Data

Sep. 30, 1995 [JP] Japan .................................... 7-242009

[51] Int. Cl.$^6$ ................................................ G01M 15/00

[52] U.S. Cl. ........................................... 73/23.32; 73/116

[58] Field of Search ................................ 73/23.31, 116, 73/117.2, 117.3, 118.1, 23.32, 866.5

[56] References Cited

U.S. PATENT DOCUMENTS

| | | | |
|---|---|---|---|
| 3,822,581 | 7/1974 | Hauck et al. | 73/116 |
| 4,135,381 | 1/1979 | Sherwin | 73/117.3 |
| 4,194,471 | 3/1980 | Baresel | 73/116 |
| 4,389,881 | 6/1983 | Butler et al. | 73/116 |
| 4,444,169 | 4/1984 | Kirisawa et al. | 73/116 |
| 5,241,853 | 9/1993 | Tsuei et al. | 73/116 |

*Primary Examiner*—George M. Dombroske
*Attorney, Agent, or Firm*—Knobbe, Martens, Olson & Bear LLP

[57] ABSTRACT

A control system for an engine embodying an oxygen sensor is provided. The oxygen sensor senses the actual combustion conditions in a combustion chamber. An insulating arrangement is provided including an insulated conduit and an insulated sensor body for maintaining high temperature of the sensor element by avoiding heat transfer from the conduit and sensor body to the engine body.

14 Claims, 6 Drawing Sheets

ENGINE SENSOR

BACKGROUND OF THE INVENTION

This invention relates to an engine sensor and more particularly to an improved engine sensor assembly particularly utilized for engine control.

In order to improve the performance of internal combustion engines, not only in the terms of specific output and fuel economy, but also so as to increase the exhaust emission control, a variety of types of control systems have been proposed. One particularly effective control system employs a sensor that senses the air/fuel ratio in the combustion chamber. By utilizing the output of this sensor, it is possible to make finite adjustments in the fuel and air control to maintain the desired fuel/air ratio.

The sensors normally utilized for this purpose are of a type which generally require them to be at a predetermined temperature in order to provide a reliable output. For example, a sensor commonly used for this purpose is an oxygen (O2) sensor. These oxygen sensors sense the amount of oxygen in the combustion products. By sensing the amount of oxygen present in the combustion products, it is possible to accurately determine the fuel/air ratio. Of course, this type of sensor must be at the proper operating temperature to provide a reliable output.

The use of oxygen sensors for engine control in relationship to two-cycle engines presents a significant problem. With a two-cycle engine, unlike four-cycle engines, there is a risk that the combustion products that are sampled may not be pure combustion products. That is, with a two-cycle engine there is a time during the scavenging cycle when the combustion products may become mixed with a flesh charge. If this occurs, then improper readings will be generated and engine control will not be successful.

Therefore, there have been proposed systems wherein the sensor communicates with the engine combustion chamber through a port and at such a time when primarily pure combustion products will be in the combustion chamber. This means that the sensor is not exposed continuously to the hot combustion gases.

Therefore, there is a risk with this type of installation that the sensor can cool between successive readings and the output signal can become unreliable.

It is, therefore, a principal object of this invention to provide an improved arrangement for communicating a combustion condition sensor with the combustion chamber of an engine.

It is a further object of this invention to provide a combustion condition sensor that is insulated so that it will maintain its temperature between successive samplings.

It is a still further object of this invention to provide an improved sensor arrangement for an engine wherein the path that delivers the combustion products to the sensor and the sensor itself is configured to ensure the maintenance of the operating temperature of the sensor.

SUMMARY OF THE INVENTION

This invention is adapted to be embodied in an engine sensor for an internal combustion engine having a combustion chamber. The sensor is operative to provide an output signal indicative of the fuel/air ratio in the combustion chamber. A conduit arrangement interconnects the combustion chamber with a chamber in which the sensor is positioned. At least the conduit that supplies the combustion products to the sensor chamber is insulated so as to maintain the sensor temperature at the desired temperature.

DETAILED DESCRIPTION OF THE PREFERRED EMBODIMENTS OF THE INVENTION

Figure 1:
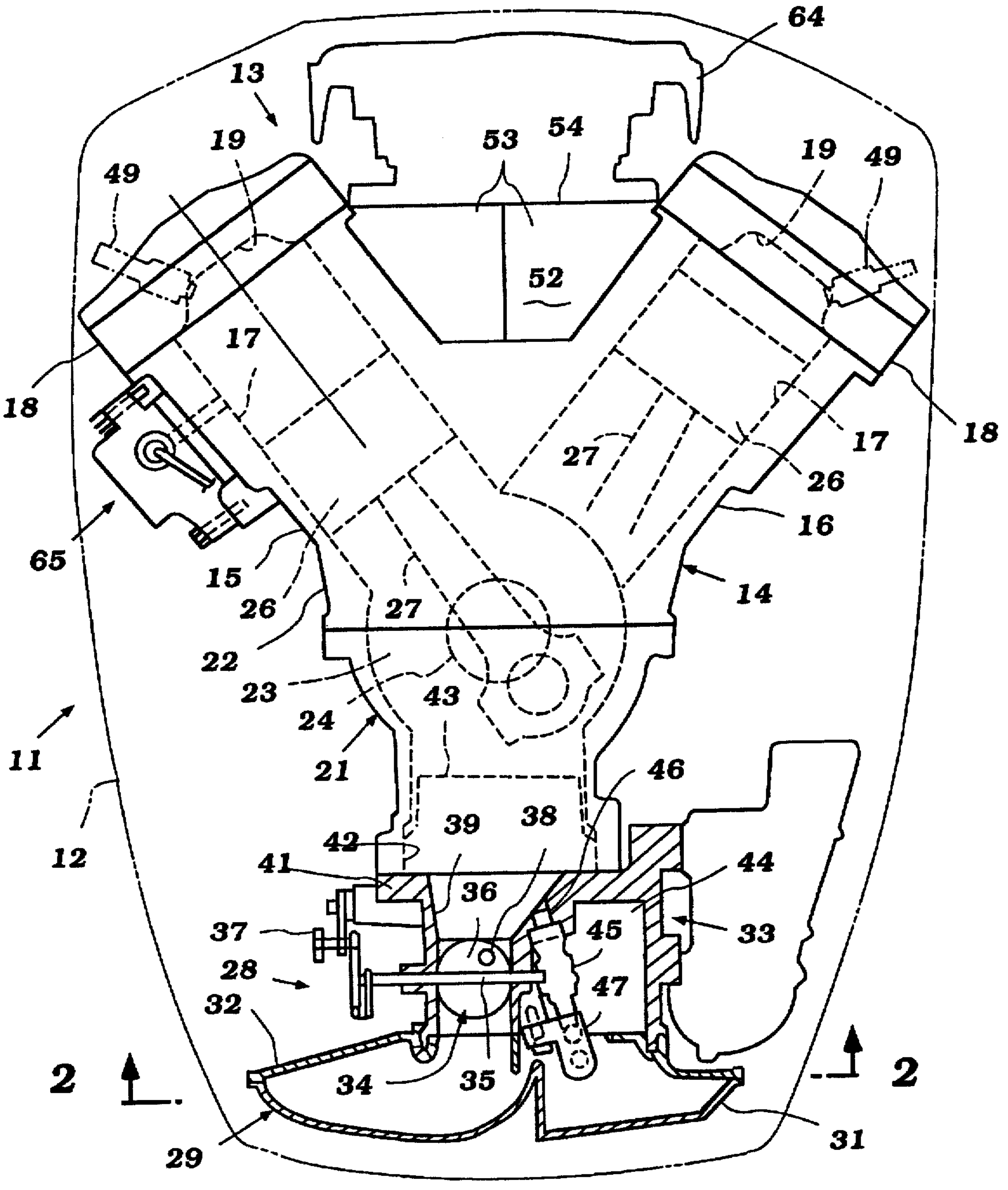
FIG. 1 is a top plan view of an outboard motor constructed in accordance with an embodiment of the invention, showing primarily the power head with the protective cowling being illustrated in phantom and a portion of the engine broken away and shown in cross section.

Referring now in detail to the drawings and initially to FIG. 1, the power head of an outboard motor, indicated generally by the reference numeral 11 is depicted in top plan view with the protective cowling 12 shown in phantom. The power head further includes an internal combustion engine, indicated generally by the reference numeral 13 and which has a construction as will be described. It is to be understood that the invention is described in conjunction with an outboard motor because this is the type of environment where the invention can frequently be utilized. This is because the invention is directed to a control system and sensor therefor that has primary value with two-cycle engines. Such engines are frequently employed as the power plant in outboard motors. Therefore, the invention is described in conjunction with such an application.

Because the invention deals primarily with the sensor for the engine and the control system, therefor, the full details of the outboard motor 11 are not illustrated nor will they be described. Reference may be had to any known construction for those details of the outboard motor which are not illustrated or described and which may be required to facilitate the practicing of the invention in such an application.

The engine 13, as noted, operates on a two-cycle crankcase compression principle. In the illustrated embodiment, the engine 13 is of the V-6 type. Therefore, it is provided with a cylinder block, indicated generally by the reference numeral 14, having a pair of cylinder banks 15 and 16 which are disposed at a V angle thereto. Each cylinder bank 15 and 16 is provided with three vertically spaced horizontally extending cylinder bores 17. Although the invention is described in conjunction with an engine of this configuration, it will be readily apparent to those skilled in the art how the invention can be practiced with engines having other cylinder numbers and other configurations.

Certain facets of the invention, however, have certain practical application to engines of this configuration, as will become apparent to those skilled in the art.

The upper ends of the cylinder banks 15 and 16 have detachably connected thereto cylinder head assemblies 18. This connection may be accomplished in any known manner and the cylinder head assemblies 18 close the upper ends of the cylinder bores 17. Each cylinder head assembly 18 is provided with a plurality of recesses 19 which cooperate with the cylinder bore 17 to form in part the combustion chambers of the engine.

A crankcase member, indicated generally by the reference numeral 21 is fixed to a skirt portion 22 of the cylinder block 14 and closes the ends of the cylinder bores 17 opposite from the cylinder head assemblies 18. The crankcase member 21 and cylinder block skirt 22 define a crankcase chamber 23 in which a crankshaft 24 is supported for rotation in a known manner. As is typical with outboard motor practice, the engine 13 is disposed so that the crankshaft 24 rotates about a vertically disposed axis.

Figure 3:
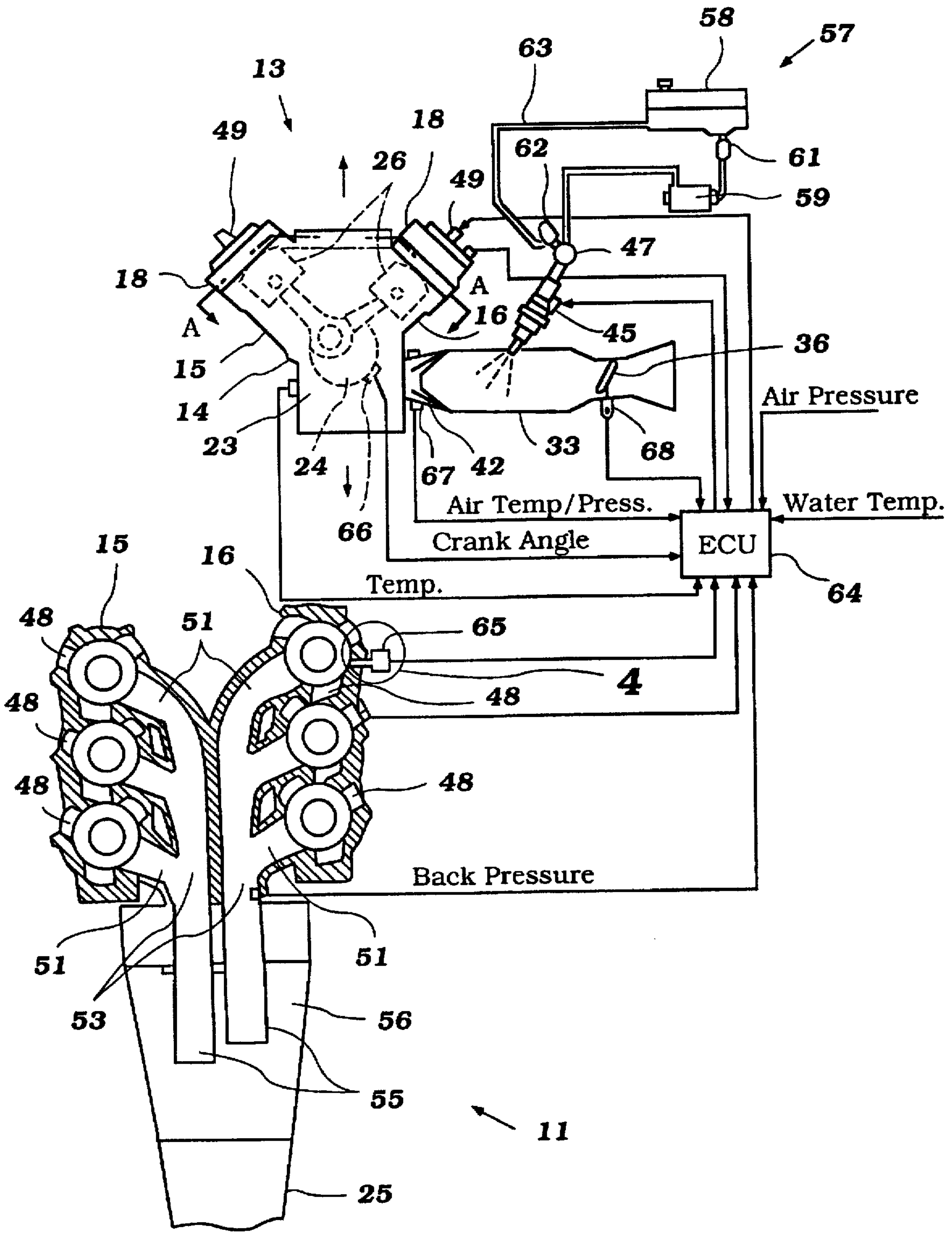
FIG. 3 is multi-part schematic view that depicts the control system for the engine operation and shows, in the upper portion, a schematic view of the engine and its relationship to the control and fuel supply and, in the lower left-hand portion, a view that represents a cross-sectional view showing the exhaust system for the outboard motor in part schematically.

This facilitates connection of the crankshaft 24 to a drive shaft which is not shown but which is journaled for rotation in a drive shaft housing assembly, shown in FIG. 3 schematically and indicated by the reference numeral 25. At the lower end of this drive shaft housing assembly 25 there is provided a propulsion device of any known type which is driven by a suitable transmission for powering an associated watercraft.

The crankshaft 24 is driven by pistons 26 that are slidably supported in the cylinder bores 17. The pistons 26 are connected by piston pins (not shown) to connecting rods 27. The connecting rods 27 are in journaled on the throws of the crankshaft 24 in a manner which is well known in this art.

As is typical with two-cycle crankcase compression engines, the crankcase chamber 23 is provided with a sealing arrangement so that the portion thereof associated with each of the cylinder bores 17 is sealed from the others. A fuel/air charge is delivered to these sealed crankcase chambers 23 by means of an induction system, indicated generally by the reference numeral 28.

Figure 2:
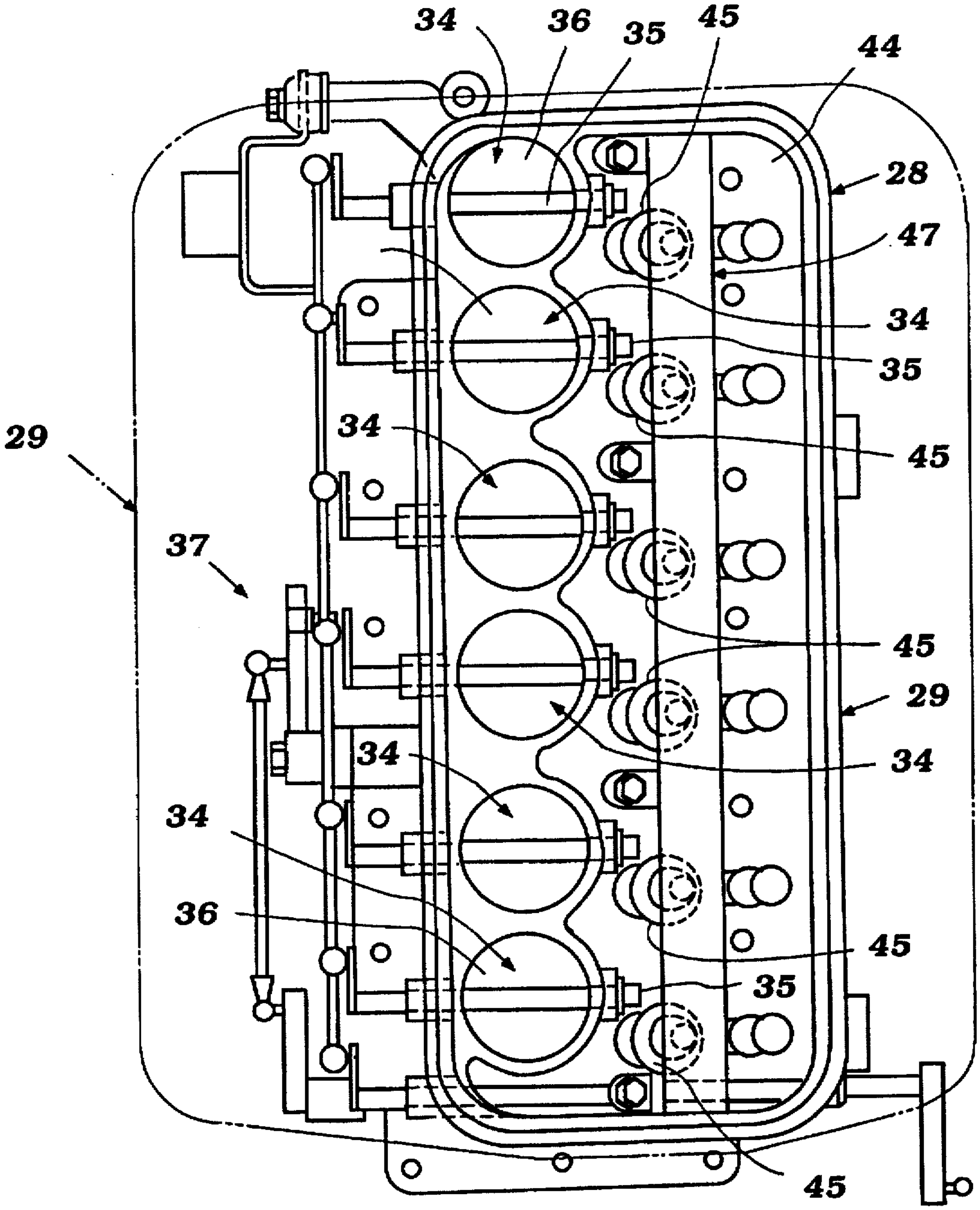
FIG. 2 is an enlarged cross-sectional view taken generally along the line 2—2 of FIG. 1 and shows the throttle arrangement and fuel injection system for the engine.

This induction system will be described by further reference to FIG. 2 in addition to FIG. 1 wherein more details of the induction system 28 appear. The induction system 28 is comprised of an air inlet device, indicated generally by the reference numeral 29 and which is shown in FIG. 2 with its cover plate 31 removed so as to more clearly show the details of the induction system. This inlet device 29 draws atmospheric air that has been admitted to the interior of the protective cowling 12 through an atmospheric air inlet opening formed therein in a known manner.

A main body portion 32 of the air inlet device is affixed in relationship to a throttle body, indicated generally by the reference numeral 33 and which is formed with a plurality of intake passages 34, one for each cylinder of the engine 13. These intake passages 34 have traversing them a plurality of throttle valve shafts 35. Butterfly-type throttle valves 36 are connected to the throttle valve shafts 35 and control the flow through the intake passages 34 in a well-known manner. A linkage system indicated generally by the reference numeral 37 is mounted at one side of the induction system 28 and specifically one side of the throttle body 33 for controlling the simultaneous movement of the throttle valves 36 in a known manner.

Each throttle valve 36 may be provided with a small idle air flow passage 38 that permits flow into a discharge section 39 of each intake passages 34 even when the throttle valve 36 is fully closed. These passages 38 are formed at a specific location for a reason which will be described.

The throttle body 33 has a flange portion 41 that permits it to be affixed to the crankcase member 21 with each discharge section 39 being in registry with an intake port 42 formed therein. Each intake port 42 serves a respective one of the crankcase chambers 23 each of which, as has been noted, is associated with a respective cylinder bore 17. A reed-type check valve assembly 43 is provided in each intake port 42 so as to permit the intake charge to enter the crankcase chambers 23 when the pistons 26 are moving upwardly daring a suction cycle. However, when the pistons 26 move downwardly to compress the charge, then the reed-type check valves 43 will preclude reverse flow.

An injector chamber 44 is formed in the throttle body 33 at one side of the intake passages 34. Electronically operated fuel injectors 45 are mounted in the throttle body 33 and have their spray nozzles 46 disposed so as to spray into the throttle body discharge sections 39. The throttle valve passages 38 are disposed in this area so as to generate a high velocity flow even at low throttle valve settings that will aid in the fuel distribution.

A fuel rail 47 is affixed to the fuel injectors 45 and delivers fuel to them from a fuel supply system that will be described in more detail by reference to FIG. 3.

The fuel/air charge which is delivered to the crankcase chambers 23 from the induction system 28 will be compressed, as aforenoted. This charge is then transferred through scavenge passages, which appear partially in FIG. 3 and are identified by the reference numeral 48 to the combustion chambers formed by the cylinder head recesses 19, cylinder bores 17, and heads of the pistons 26 in a manner well-known in this art.

Spark plugs 49 are mounted in the cylinder head assemblies 18 and have their gaps extending into the cylinder head recesses 19 for firing the thus delivered charge. This charge will then bum and expand so as to drive the pistons 26 downwardly. The manner of firing the spark plugs will be described later by reference to FIG. 3.

As the charge expands and the pistons 26 move downwardly they will eventually open exhaust ports 51 (FIG. 3) formed in the cylinder blocks 15 and 16 in a valley 52 formed therebetween. These exhaust ports 51 communicate with exhaust manifolds 53 that are formed integrally within the cylinder block assembly by means that include a cover plate 54. As seen in FIG. 3, the exhaust manifold 53 communicates with exhaust pipes 57 that depend into an expansion chamber 56 formed within the drive shaft housing 25.

From the expansion chamber 56 the exhaust gases are discharged to the atmosphere through any suitable type of exhaust system. As is typical with outboard motor practice, this exhaust system may include a high-speed underwater discharge and a low-speed above-the-water discharge. Again, since the invention deals primarily with the control system for the engine 13, this portion of the construction is not illustrated but may be of any type conventionally utilized in this art.

The control system for firing of the spark plugs 49 and also for controlling the fuel injectors 45 will now be described by particular reference to FIG. 3. First, the fuel supply system, indicated generally by the reference numeral 57 that supplies fuel to the fuel injectors 45 will be described by reference to the upper right-hand side of this figure. There is provided a remotely positioned fuel storage tank 58 from which fuel is drawn by a pumping arrangement that includes a high-pressure pump 59 through a fuel filter 61. This fuel is then delivered through appropriate conduits and quick disconnect connections to the power head. Mounted at an appropriate position on the fuel rail 47 is a pressure relief valve 62 that sets the maximum pressure in the fuel rail 47. This is done by dumping excess fuel back to the fuel tank 58 through a return conduit 63.

The timing of injection and duration of injection of fuel from the injectors 45 and timing of firing of the spark plugs 49 is controlled by an ECU, indicated schematically at 64. This ECU 64 may be conveniently mounted on the cover plate 54 in a cool location. The actual control strategy for controlling not only the timing of the spark plugs 49 and the timing and duration of fuel supplied by the injectors 45 may be of any known type. However, this control includes an oxygen sensor assembly, indicated generally by the reference numeral 65 and which has a construction as will be best described by reference to FIGS. 4–6.

In addition to this sensor, there are certain other signals that are transmitted to the ECU from various sensors. These sensors may include an engine temperature sensor, a crankshaft rotational position sensor 66 and intake air temperature sensor 67, a throttle position signal from a throttle position sensor 68 and other sensors such as ambient sensors such as atmospheric air pressure or cooling water inlet temperature. In addition, a back pressure signal indicative of the back pressure in the exhaust manifold 53 may also be provided. As is noted, the actual control strategy may be of any known type and may include a feedback control system.

Figure 4:
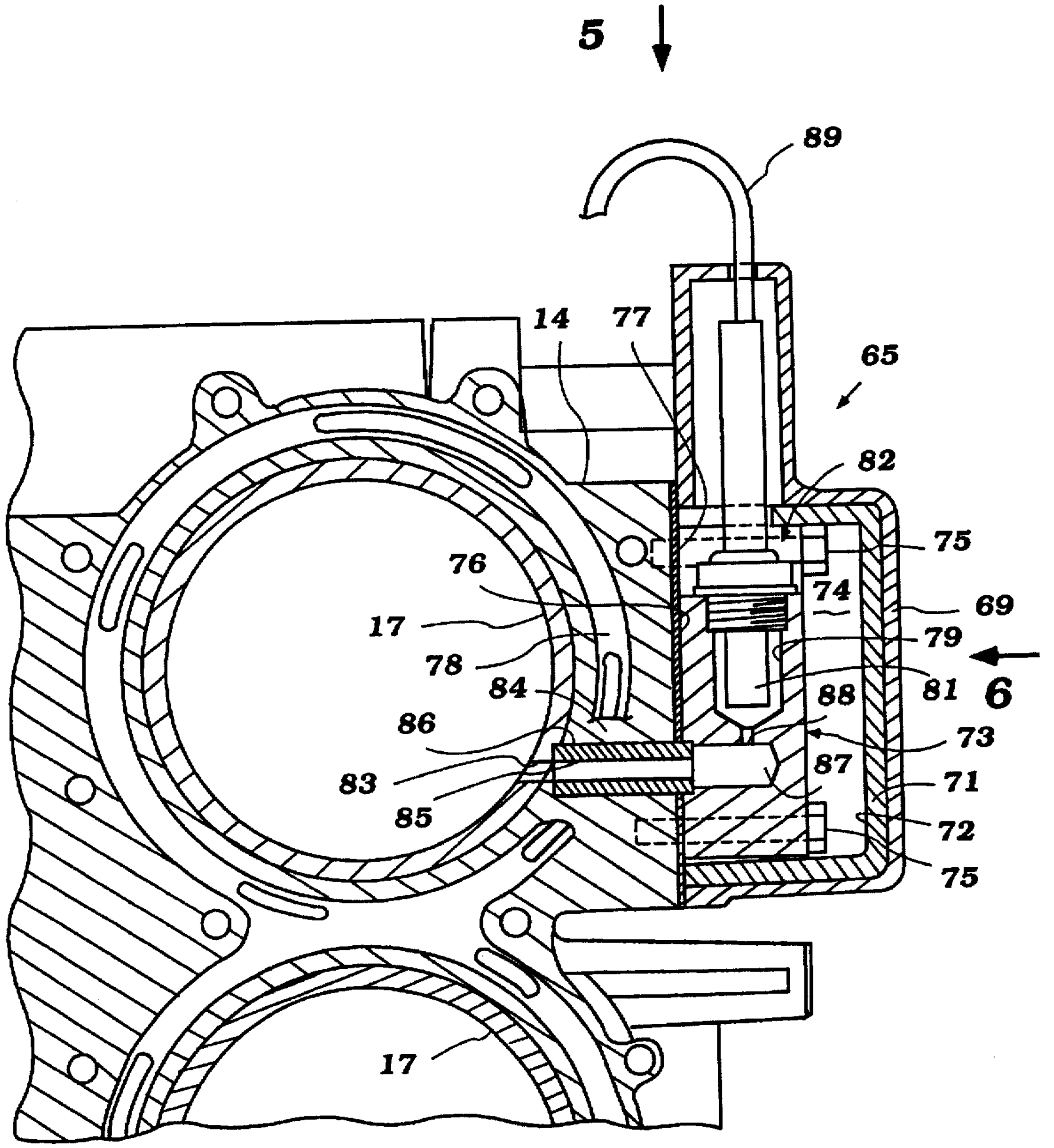
FIG. 4 is an enlarged cross-sectional view of the area encompassed by the circle 4 in FIG. 3 and shows the sensor and its communication with the combustion chamber of the engine.
Figure 5:
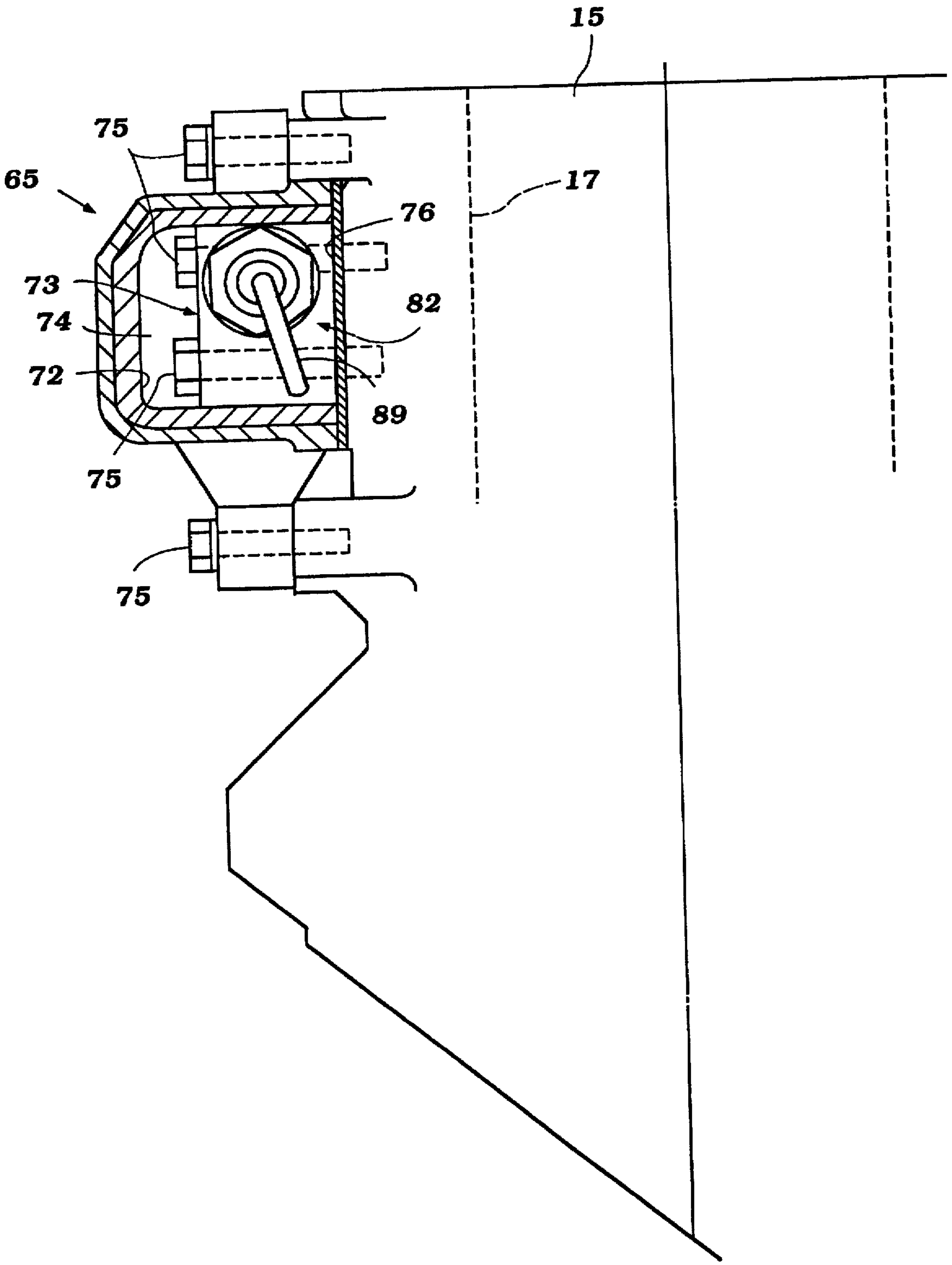
FIG. 5 is a view looking generally in the direction of the arrow 5 in FIG. 4 with a portion broken away and shown in section.
Figure 6:
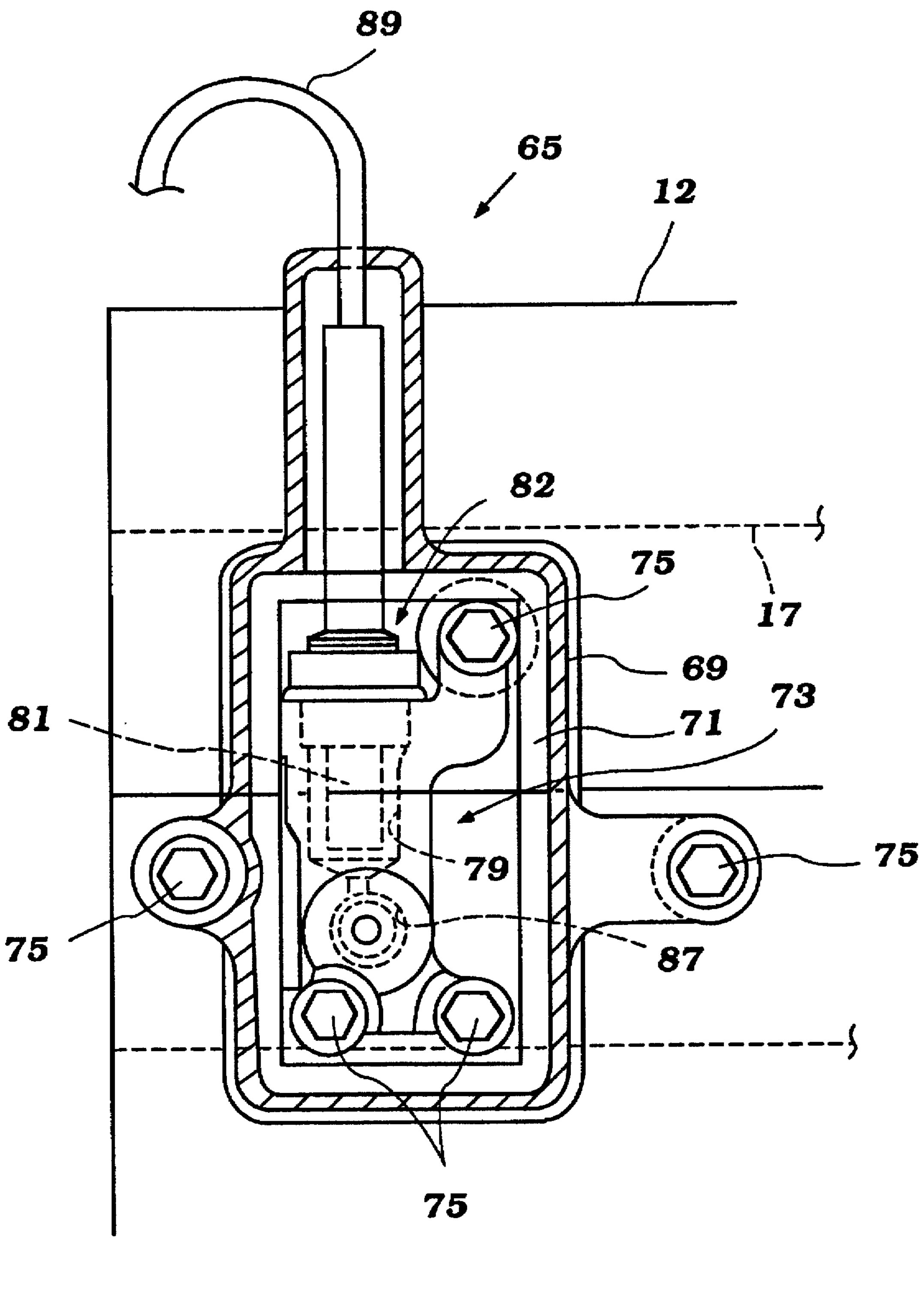
FIG. 6 is a view looking generally in the direction of the arrow 6 in FIG. 4 again with a portion broken away and shown in section.

The construction of the oxygen sensor assembly, indicated by the reference numeral 65 will now be described by primary reference to FIGS. 4–6. It should be noted that the oxygen sensor assembly 45 is mounted on one of the cylinder banks such as the cylinder bank 15 but preferably is disposed outside of the valley 52 between the cylinder banks. This assembly 65 includes an outer housing 69 which is formed from sheet metal or the like and which contains within it an insulating shell 71 formed from a suitable insulating material having a low coefficient of thermal conductivity and which has an inner surface 72 spaced from an inner sensor body assembly 73 so as to provide an insulating air gap 74. This assembly is mounted to the cylinder block 14 by threaded fasteners 75.

A heat insulating gasket 76 is mounted between the body 73 and a surface 77 of the cylinder block 14 so as to minimize heat transfer between the sensor chamber 74 and the engine body. As has been noted, the engine 13 is water-cooled and the cooling jackets 78 which surround the cylinder bores 17 appear in FIG. 4.

The sensor body 75 is formed with a chamber 79 in which the sensor portion 81 of an oxygen sensor, indicated generally by the reference numeral 82 protrudes. This sensor chamber 79 receives exhaust gases or combustion products through a small port 83 that intersects the cylinder bore 17 at a point immediately adjacent the point where the exhaust port begins to open. This port is also spaced tom the scavenge port so that any incoming scavenge charge will not pass into the sensor chamber 79.

A surrounding portion 84 of the cylinder block 14 is provided without any cooling jacket and a flow path 85 is provided by an insulating sleeve 86. The sleeve 86 has a substantially lower thermal conductivity than that of the cylinder block 14 and thus the combustion products that pass through the passage 85 will not exchange any significant heat to the cylinder block 14 where they may be cooled.

The passage 85 opens into a chamber 87 formed in the body 73 and which communicates with the sensor chamber 79 through a small orifice 88. As a result of this construction, it will be ensured that the exhaust gases that pass through the sensor chamber 79 will be at a high temperature and will not experience any significant cooling. In this way, not only will the temperature of the oxygen sensor 81 be maintained, but it will also be ensured that foreign particles will maintain in the vapor state and will not condense on the elements of the sensor.

A conductor 89 carries the signal from the sensor element 81 to the ECU 64 for the control purposes.

Thus, from the foregoing description it should be readily apparent that the described construction is extremely effective in providing a good sensor output and one in which the sensor temperature will be maintained high even though the exhaust products are only cyclically delivered to the sensor chamber. The flow arrangement provided will also ensure that the flow is somewhat restricted and thus will also ensure the maintenance of the desired operating temperature.

Of course, the foregoing description is that of preferred embodiments of the invention, and various changes and modifications may be made without departing from the spirit and scope of the invention, as defined by the appended claims.

What is claimed is:

1. A combustion condition sensor for an internal combustion engine having an engine body forming a combustion chamber, a sensor body affixed to said engine body and defining a sensor chamber, a sensor element protruding into said sensor chamber, and conduit means for communicating said combustion chamber with said sensor chamber comprising an insulated section.

2. A combustion condition sensor as set forth in claim 1, wherein the insulated section extends at least in part through the engine body.

3. A combustion condition sensor as set forth in claim 2, wherein the conduit portion has a lower thermal conductivity than the engine body.

4. A combustion condition sensor as set forth in claim 3, wherein the sensor body further is thermally insulated.

5. A combustion condition sensor as set forth in claim 4, wherein the sensor body has a lower thermal conductivity than the engine body.

6. A combustion condition sensor as set forth in claim 5, wherein the sensor body is enclosed within an insulated chamber.

7. A combustion condition sensor as set forth in claim 6, wherein the engine body comprises a cylinder block.

8. A combustion condition sensor as set forth in claim 7, wherein the sensor body is positioned on an outer surface of the cylinder block.

9. A combustion condition sensor as set forth in claim 8, wherein the cylinder block is formed with a pair of angularly inclined cylinder banks.

10. A combustion condition sensor as set forth in claim 9, wherein the sensor body is mounted on the outer portion of one of the cylinder banks.

11. A combustion condition sensor as set forth in claim 10, wherein the conduit portion has a lower thermal conductivity than the engine body.

12. A combustion condition sensor as set forth in claim 11, wherein the sensor body further is thermally insulated.

13. A combustion condition sensor as set forth in claim 12, wherein the sensor body has a lower thermal conductivity than the engine body.

14. A combustion condition sensor as set forth in claim 13, wherein the sensor body is enclosed within an insulated chamber.

* * * * *